(12) United States Patent
Hanioka et al.

(10) Patent No.: US 9,862,047 B2
(45) Date of Patent: Jan. 9, 2018

(54) WELDING METHOD AND STEAM GENERATOR CHANNEL HEAD

(71) Applicant: MITSUBISHI HEAVY INDUSTRIES, LTD., Tokyo (JP)

(72) Inventors: Takashi Hanioka, Tokyo (JP); Hirokazu Kadowaki, Tokyo (JP); Taisuke Ito, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/372,414

(22) PCT Filed: Nov. 28, 2012

(86) PCT No.: PCT/JP2012/080782
§ 371 (c)(1),
(2) Date: Jul. 15, 2014

(87) PCT Pub. No.: WO2013/111444
PCT Pub. Date: Aug. 1, 2013

(65) Prior Publication Data
US 2015/0298235 A1    Oct. 22, 2015

(30) Foreign Application Priority Data

Jan. 24, 2012 (JP) .................. 2012-012447

(51) Int. Cl.
*B23K 9/04* (2006.01)
*F22B 37/00* (2006.01)
(Continued)

(52) U.S. Cl.
CPC .............. *B23K 9/044* (2013.01); *B23K 9/048* (2013.01); *B23K 9/18* (2013.01); *B23K 25/005* (2013.01);
(Continued)

(58) Field of Classification Search
CPC ........ B23K 9/044; B23K 9/048; B23K 25/00; B23K 25/005
(Continued)

(56) References Cited

U.S. PATENT DOCUMENTS 2,258,913 A * 10/1941 Stone ..................... B23K 9/035
219/137 R
4,725,512 A * 2/1988 Scruggs ................. B23K 35/30
148/403
(Continued)

FOREIGN PATENT DOCUMENTS

JP  56-165563 A  12/1981
JP  57-184578 A  11/1982
(Continued)

OTHER PUBLICATIONS

English Translation of Written Opinion dated Aug. 1, 2013, issued in corresponding Application No. PCT/JP/2012/080782.
(Continued)

*Primary Examiner* — David Angwin
*Assistant Examiner* — Justin Dodson
(74) *Attorney, Agent, or Firm* — Westerman, Hattori, Daniels & Adrian, LLP (57) ABSTRACT

A welding method for making cladding or buttering on an inner surface of a base material, an inner surface of an opening portion formed in the base material, and the cut surface formed in such a manner that the cut surface is continuous from the inner surface of the base material to the inner surface of the opening portion, wherein the welding method includes a step of forming a protruding portion on the base material in advance, the protruding portion including a temporary welding surface extending toward the center of the opening portion in such a manner that the temporary welding surface is uniformly continuous to the inner surface (Continued)

of the base material and including the cut surface buried therein.

8 Claims, 10 Drawing Sheets

(51) Int. Cl.
    *G21C 21/00*     (2006.01)
    *G21D 1/00*     (2006.01)
    *B23K 9/18*     (2006.01)
    *B23K 25/00*     (2006.01)
    *F22B 1/02*     (2006.01)

(52) U.S. Cl.
    CPC ............ *F22B 1/025* (2013.01); *F22B 37/002* (2013.01); *G21C 21/00* (2013.01); *G21D 1/006* (2013.01); *Y02E 30/40* (2013.01)

(58) Field of Classification Search
    USPC ........... 219/76.1, 73–73.21, 137 R; 164/470, 164/497, 514, 515
    See application file for complete search history.

(56) References Cited

U.S. PATENT DOCUMENTS

| | | | |
|---|---|---|---|
| 4,857,693 A | 8/1989 | Rump | |
| 5,872,396 A * | 2/1999 | Kosaki | H01L 21/78 |
| | | | 257/620 |
| 7,748,598 B2 * | 7/2010 | Want | B01J 3/04 |
| | | | 228/164 |
| 2011/0194663 A1 * | 8/2011 | Hori | F16L 5/022 |
| | | | 376/204 |
| 2012/0175352 A1 | 7/2012 | Kamo et al. | |

FOREIGN PATENT DOCUMENTS

| | | |
|---|---|---|
| JP | 58-196167 A | 11/1983 |
| JP | 60-54281 A | 3/1985 |
| JP | 64-44281 A | 2/1989 |
| JP | 8-177421 A | 7/1996 |
| JP | 2002-307166 A | 10/2002 |
| JP | 2004-66261 A | 3/2004 |
| JP | 3966655 B2 | 8/2007 |
| JP | 2008-212945 A | 9/2008 |
| JP | 2010-19699 A | 1/2010 |
| JP | 2011-75453 A | 4/2011 |

OTHER PUBLICATIONS

Extended European Search Report dated Sep. 22, 2015, issued in counterpart European Patent Application No. 12866448.9 (5 pages).
Office Action dated Sep. 24, 2015, issued in counterpart Japanese Patent Application No. 2012-012447, with English translation (4 pages).
International Search Report dated Jan. 8, 2013 issued in corresponding application No. PCT/JP2012/080782.
Written Opinion of the Searching Authority dated Jan. 8, 2013 issued in corresponding application No. PCT/JP2012/080782.
Notice of Allowance dated Sep. 24, 2015, issued in counterpart Japanese Patent Application No. 2012-012447, with English translation (4 pages).

* cited by examiner

WELDING METHOD AND STEAM GENERATOR CHANNEL HEAD

FIELD

The present invention relates to a welding method for making cladding or buttering on a surface of a base material having an opening portion, and a steam generator channel head that is applied to the welding method.

BACKGROUND

Patent Literature 1 describes a shielding structure for shielding radiation from a channel head that passes through an opening portion of a nozzle after the nozzle and a primary cooling water passage are cut off during maintenance of the nozzle provided in the channel head constituting a steam generator of a nuclear power plant.

CITATION LIST

Patent Literature

Patent Literature 1: Japanese Laid-open Patent Publication No. 2010-19699

SUMMARY

Technical Problem

As indicated in Patent Literature 1, the channel head of the steam generator is a portion for receiving primary cooling water provided from a nuclear reactor of a nuclear power plant. Since the primary cooling water has radiation, the inner surface of the channel head has cladding or buttering of a predetermined thickness. The channel head of the steam generator is divided by a dividing wall into an inlet side channel head for receiving the primary cooling water from the nuclear reactor and an outlet side channel head for returning the primary cooling water back to the nuclear reactor. The inlet side channel head is provided with an opening portion for an inlet side nozzle for receiving the primary cooling water from the nuclear reactor and an opening portion for forming a manhole through which a worker enters and exits during maintenance. Likewise, the outlet side channel head is provided with an opening portion for an outlet side nozzle for returning the primary cooling water back to the nuclear reactor and an opening portion for forming a manhole through which a worker enters and exits during maintenance. Each opening portion is cut and processed so that the opening edge of the inner side of the channel head is in an arc shape in order to alleviate stress concentration.

When cladding or buttering is made on the inner surface of the channel head, electroslag welding or submerged-arc welding is employed. The electroslag welding or the submerged-arc welding uses a flux shield for shielding with powdered flux. The electroslag welding or the submerged-arc welding is to make belt-like cladding or buttering having a predetermined width using an automatic welding machine, and therefore, cladding or buttering can be efficiently made on a large area.

However, as described above, the electroslag welding or the submerged-arc welding is to make belt-like parallel cladding or buttering having a predetermined width, and therefore, the edge portion of the cladding or buttering is formed in a linear manner. For this reason, in proximity to the opening edge of the opening portion at the inner side of the channel head, it is difficult to apply the cladding or buttering along the circle of the opening edge. On the other hand, from the exterior side of the channel head, cladding or buttering is made on the inner surface of the opening portion. In this case, the cladding or buttering can be made along the circle of the opening portion, and therefore, automatic welding can be performed. However, since the cladding or buttering on the inner surface of the channel head is not made along the circle of the opening portion, cladding or buttering has to be made manually on the border with the cladding or buttering of the automatic welding. As a result, it is troublesome to do the work of the cladding or buttering. In addition, the opening edge of the opening portion at the inner side of the channel head is processed into an arc shape, and the flux drops along the arc, and therefore, it is difficult to make cladding or buttering to the immediate proximity of the opening edge of the opening portion, and the border with the cladding or buttering from the outside of the channel head as described above is greatly spaced part, and therefore, this increases the range of manual cladding or buttering.

The present invention is to solve the above problem, and it is an object of the present invention to provide a welding method capable of efficiently making cladding or buttering for a base material having an opening portion on the surfaces of the base material and the opening portion, and a steam generator channel head capable of efficiently making cladding or buttering for a base material having an opening portion on the surfaces of the base material and the opening portion.

Solution to Problem

According to an aspect of the present invention, a welding method for sequentially making cladding or buttering on a surface of a base material, an inner surface of an opening portion formed in the base material, and a cut surface formed continuously from the surface of the base material to the inner surface of the opening portion, includes: forming a protruding portion on the base material in advance, the protruding portion including a temporary welding surface extending toward a center of the opening portion in such a manner that the temporary welding surface is uniformly continuous to the surface of the base material and burying the cut surface therein; subsequently making a first cladding or buttering in which belt-like welding having a predetermined width is formed in parallel with respect to the surface of the base material and the temporary welding surface; subsequently forming the cut surface by cutting the protruding portion as well as a portion of the first cladding or buttering along a contour shape of the inner surface of the opening portion; subsequently making a second cladding or buttering with respect to the inner surface of the opening portion and the cut surface along the contour shape of the inner surface of the opening portion such that the second cladding or buttering is formed continuously from the first cladding or buttering.

According to the welding method, the protruding portion including the temporary welding surface extending toward the center of the opening portion in such a manner that the temporary welding surface is uniformly continuous to the surface of the base material and including the cut surface buried therein is formed on the base material in advance, and thereafter, the first cladding or buttering applied to the surface of the base material and the temporary welding surface is provided to cover the cut surface. Therefore, when the cut surface is thereafter formed by cutting the protruding portion as well as a portion of the first cladding or buttering so that the cut surface is along the contour shape of the inner surface of the opening portion, the edge of the first cladding or buttering at the opening portion is cut along the contour shape of the inner surface of the opening portion. As a result, when the second cladding or buttering is thereafter made on the inner surface of the opening portion and the cut surface along the contour shape of the inner surface of the opening portion so that the second cladding or buttering is continuous to the first cladding or buttering, the first cladding or buttering is continuous to the second cladding or buttering, and therefore, it is not necessary to manually make cladding or buttering at the border between the first cladding or buttering and the second cladding or buttering, and therefore, the cladding or buttering can be efficiently made for the base material having the opening portion on the surfaces of the opening portion and the base material.

Advantageously, in the welding method, where a width of the first cladding or buttering is denoted as H, the protruding portion has the temporary welding surface in range of at least $H^{1/2}$ from a border portion between the cut surface and the surface of the base material to the center of the opening portion.

According to this welding method, the temporary welding surface is provided in a range of at least $H^{1/2}$ from the border portion between the cut surface and the surface of the base material to the center of the opening portion, and therefore, the first cladding or buttering can be applied so as to be in contact with the border portion. As a result, when the cut surface is formed, the edge of the first cladding or buttering at the opening portion is cut along the contour shape of the inner surface of the opening portion, so that the second cladding or buttering, which is thereafter made, can be made so as to be reliably continuous to the first cladding or buttering. In addition, when the protruding portion is formed to have the temporary welding surface in the range of $H^{1/2}$, not only the above effects are obtained but also the cut surface can be processed efficiently by limiting the amount of cutting of the protruding portion to the minimum.

Advantageously, in the welding method, the protruding portion is formed to have a corner portion which connects from the temporary welding surface to the inner surface of the opening portion, and in the step of making the first cladding or buttering, a tab is provided to cover a least a periphery of the opening portion so that the tab is in contact with the corner portion.

According to this welding method, when the welding using the flux shield is employed for the first cladding or buttering, the tab prevents the flux from dropping from the opening portion, and therefore, the first cladding or buttering can be applied to the entire temporary welding surface of the protruding portion. Moreover, the tab is provided to be in contact with the corner portion which connects from the temporary welding surface of the protruding portion to the inner surface of the opening portion, and therefore, this configuration enables stable arrangement, and sufficiently prevents the flux from dropping from the opening portion.

Advantageously, in the welding method, the protruding portion extends from the temporary welding surface toward the center of the opening portion, and is integrally formed with the tab covering at least the periphery of the opening portion.

According to this welding method, when the first cladding or buttering uses the welding using the flux shield, the tab prevents the flux from dropping from the opening portion, and therefore, the first cladding or buttering can be applied to the entire temporary welding surface of the protruding portion.

Advantageously, in the welding method, an opening hole is provided in a center of the tab, and in the step of making the first cladding or buttering, a lid closing the opening hole is provided.

According to this welding method, when the first cladding or buttering uses the welding using the flux shield, the tab and the lid prevent the flux from dropping from the opening portion, and therefore, the first cladding or buttering can be applied to the entire temporary welding surface of the protruding portion.

According to another aspect of the present invention, a steam generator channel head for a steam generator arranged with, in a body portion having a hollow sealed shape, a heat transfer tube bundle including a plurality of inverted U shaped heat transfer tubes in which primary cooling water flows, and the steam generator exchanged heat with the primary cooling water flowing through the heat transfer tubes by receiving secondary cooling water into the body portion, including: an inlet side channel head provided at a lower end portion of the body portion, and is arranged with an inlet side nozzle for receiving the primary cooling water and a manhole for work, wherein the inlet side channel head is in communication with one end portion of the heat transfer tubes; and an outlet side channel head provided at the lower end portion of the body portion, and is arranged with an outlet side nozzle for discharging the primary cooling water and a manhole for work, wherein the outlet side channel head is in communication with the other end portion of the heat transfer tubes. A protruding portion is formed before a cladding or buttering of a predetermined thickness is made continuously on an inner surface of each of the channel heads, an inner surface of an opening portion constituting the inlet side nozzle, the outlet side nozzle, and the manholes, and a cut surface formed continuously from the inner surface of the channel head to the inner surface of the opening portion, wherein the protruding portion includes a temporary welding surface extending toward a center of the opening portion in such a manner that the temporary welding surface is uniformly continuous to the inner surface of the channel head and including the cut surface buried therein and formed continuous from the inner surface of the channel head to the inner surface of the opening portion.

According to this steam generator channel head, the protruding portion including the temporary welding surface extending toward the center of the opening portion in such a manner that the temporary welding surface is uniformly continuous to the inner surface of the channel heads and including the cut surface buried therein is formed in advance in the channel heads, so that the first cladding or buttering thereafter applied to the inner surface and the temporary welding surface of the channel heads is provided to be in contact with the cut surface. Therefore, when the cut surface is thereafter formed by cutting the protruding portion as well as a portion of the first cladding or buttering so that the cut surface is along the contour shape of the inner surface of the opening portion, the edge of the first cladding or buttering at the opening portion is cut along the contour shape of the inner surface of the opening portion. As a result, when the second cladding or buttering is thereafter made on the inner surface of the opening portion and the cut surface along the contour shape of the inner surface of the opening portion so that the second cladding or buttering is continuous to the first cladding or buttering, the first cladding or buttering is continuous to the second cladding or buttering, and therefore, it is not necessary to manually make cladding or buttering at the border between the first cladding or buttering and the second cladding or buttering, and the cladding or buttering can be efficiently made for the channel heads having the opening portion on the inner surfaces of the opening portion and the channel heads.

Advantageous Effects of Invention

According to the present invention, cladding or buttering can be efficiently made for a base material having an opening portion on the surfaces of the base material and the opening portion.

DESCRIPTION OF EMBODIMENT

An embodiment according to the present invention will be hereinafter explained with reference to drawings. It should be noted that this invention is not limited to this embodiment. Constituent elements in the embodiment below include those that can be easily replaced by a person skilled in the art, or those that are substantially the same.

Figure 11:
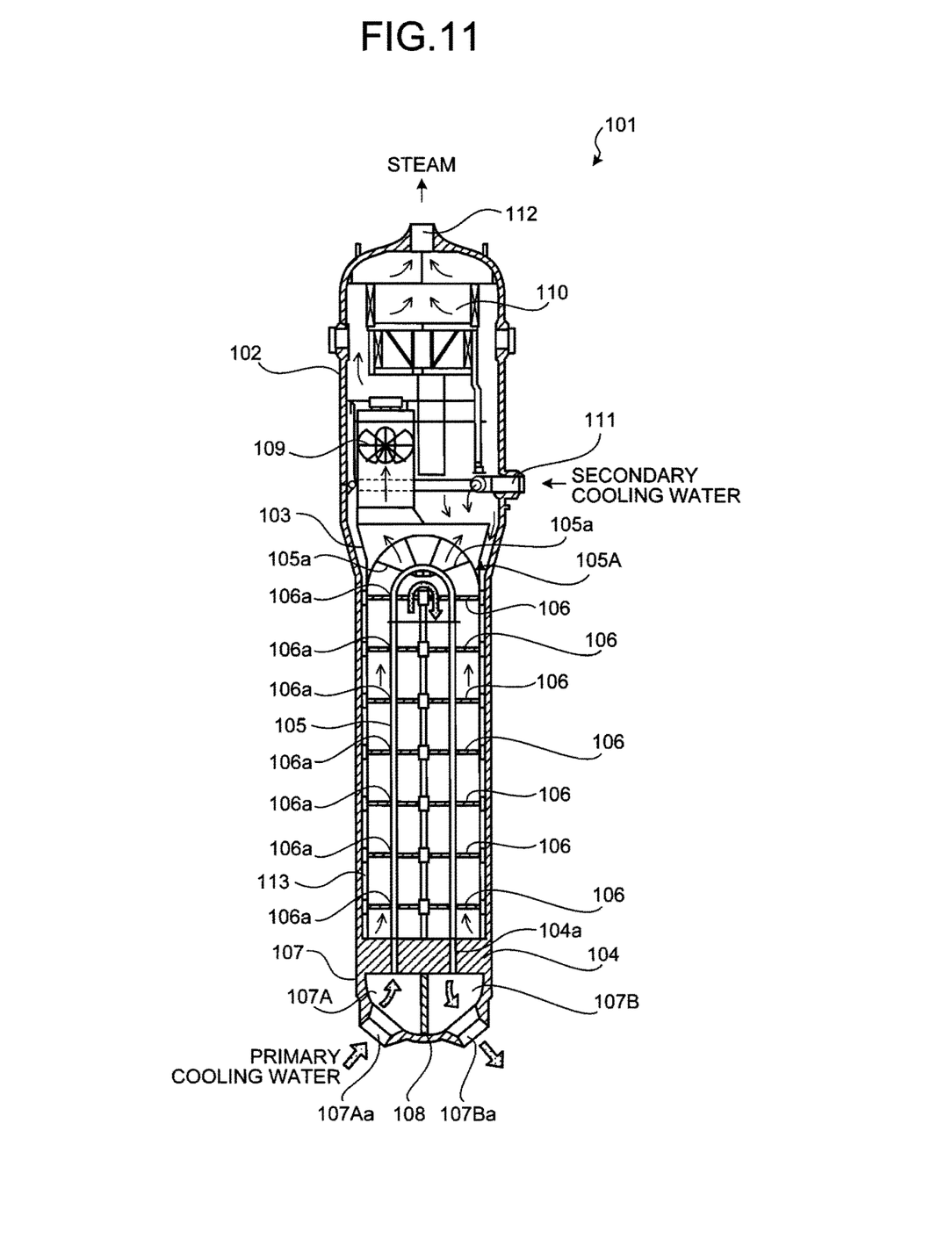
FIG. 11 is an explanation diagram illustrating a configuration of a steam generator.
Figure 12:
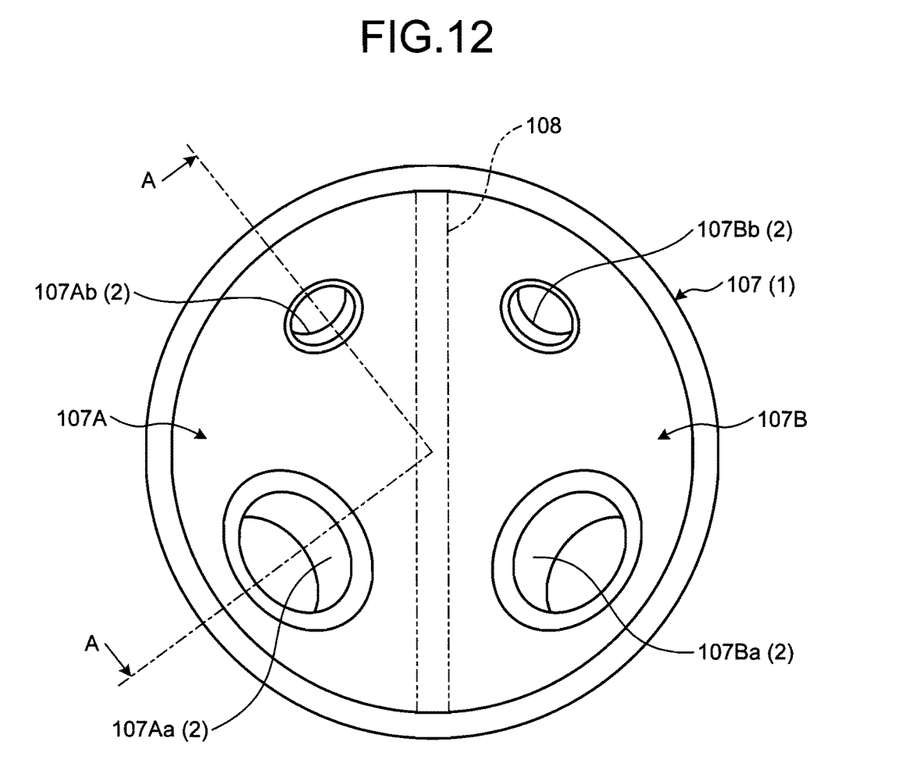
FIG. 12 is a top view illustrating a steam generator channel head to which the welding method according to the embodiment of the present invention is applied.
Figure 13:
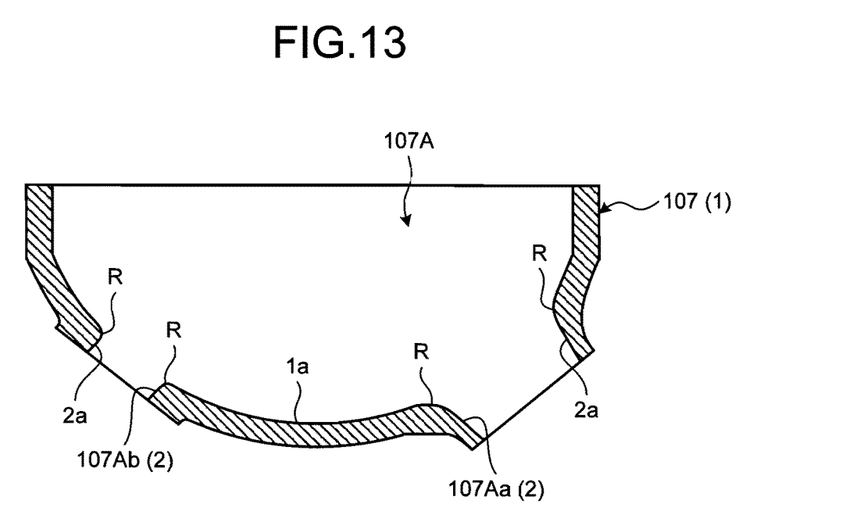
FIG. 13 is a cross sectional view taken along A-A of FIG. 12.
Figure 14:
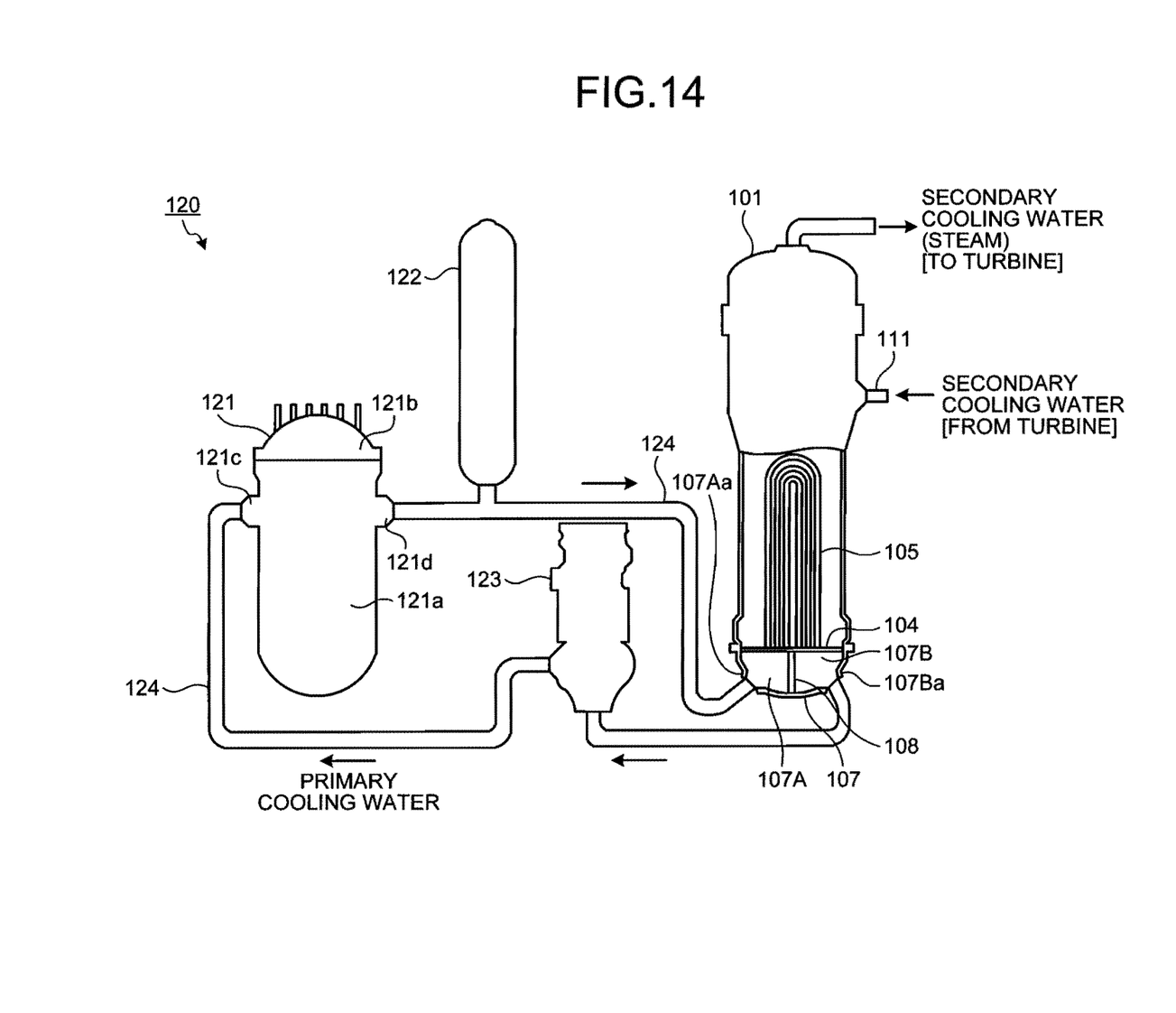
FIG. 14 is a schematic view illustrating an example of nuclear power equipment to which the steam generator is applied.

FIG. 11 is an explanation diagram illustrating a configuration of a steam generator. FIG. 12 is a top view illustrating a steam generator channel head to which the welding method according to the embodiment of the present invention is applied. FIG. 13 is a cross sectional view taken along A-A of FIG. 12. FIG. 14 is a schematic view illustrating an example of nuclear power equipment to which the steam generator is applied.

As shown in FIG. 11, the steam generator 101 has a body portion 102. The body portion 102 is in a hollow cylindrical shape that extends in the vertical direction and that is sealed, and the lower half portion is of a slightly smaller diameter than the upper half portion. A tube bundle shroud 103 is provided in the lower half portion of the body portion 102. The tube bundle shroud 103 is in a cylindrical shape arranged with a predetermined interval from the inner wall surface of the body portion 102. The lower end portion of the tube bundle shroud 103 extends to the proximity of the tube plate 104 arranged at the lower portion in the lower half portion of the body portion 102. A heat transfer tube bundle 105A is provided in the tube bundle shroud 103. The heat transfer tube bundle 105A includes multiple heat transfer tubes 105 in an inverted U shape. The upper end portion of the heat transfer tube bundle 105A has an arc portion in the inverted U shape explained above of the heat transfer tube 105. The heat transfer tube 105 constitutes heat transfer tube layers arranged in such an arrangement that larger arc portion diameters increase from the center to the outside, and the heat transfer tube layers are overlapped with different diameters whereby the upper end portion of the heat transfer tube bundle 105A is made into a hemispherical shape. In the hemispherical shape portion of the heat transfer tube bundle 105A, a vibration control member 105a is provided between the arc portions of the heat transfer tube layers so as to suppress fluid-induced vibration that may occur when the primary cooling water passes through the heat transfer tubes 105. Each of the heat transfer tubes 105 is arranged such that the U-shaped arc portion faces the upper side, and the lower end portion is inserted into and supported by a tube hole 104a of the tube plate 104, wherein the middle portion is supported by the tube bundle shroud 103 by means of the multiple tube support plates 106. The tube support plate 106 has many tube holes 106a formed therethrough, and when each of the heat transfer tubes 105 is inserted into the tube hole 106a, the heat transfer tube 105 is supported thereby.

In the lower end portion of the body portion 102, a channel head 107 is provided. As shown in FIGS. 11 to 13, the inside of the channel head 107 is divided by a dividing wall 108 into an inlet side channel head 107A and an outlet side channel head 107B. One end portion of each of the heat transfer tubes 105 is inserted into the inlet side channel head 107A, and the other end portion of each of the heat transfer tubes 105 is inserted into the outlet side channel head 107B. The inlet side channel head 107A is formed with an inlet side nozzle 107Aa in communication with the outside of the body portion 102. The outlet side channel head 107B is formed with an outlet side nozzle 107Ba in communication with the outside of the body portion 102. The inlet side nozzle 107Aa is coupled with a cooling water pipe (not shown) in which the primary cooling water flows from a pressurized water reactor. The outlet side nozzle 107Ba is coupled with a cooling water pipe (not shown) in which the primary cooling water which has been subjected to heat exchange flows to the pressurized water reactor. The inlet side channel head 107A and the outlet side channel head 107B are formed with maintenance manholes 107Ab, 107Bb where a worker can enter into the channel head 107 for maintenance and inspection. In the welding method according to the present embodiment, the channel head 107 is a base material 1, and portions constituting the inlet side nozzle 107Aa, the outlet side nozzle 107Ba, and the manholes 107Ab, 107Bb are opening portions 2.

In the upper half portion of the body portion 102, a steam-water separation device 109 and a moisture separation device 110 are provided. The steam-water separation device 109 separates received water into steam and hot water. The moisture separation device 110 removes moisture from the separated steam and makes it into the state close to dry steam. Between the steam-water separation device 109 and the heat transfer tube bundle 105A, a water feed pipe 111 is inserted to feed the secondary cooling water from the outside into the body portion 102. Further, in the upper end portion of the body portion 102, a steam discharge port 112 is formed. In the lower half portion of the body portion 102, a water feed passage 113 is formed, in which secondary cooling water fed from the water feed pipe 111 into the body portion 102 flows downward between the body portion 102 and the tube bundle shroud 103, and the secondary cooling water turns back at the tube plate 104, and then the secondary cooling water ascends along the heat transfer tube bundle 105A. The steam discharge port 112 is coupled with a cooling water pipe (not shown) for feeding steam to the turbine. The water feed pipe 111 is coupled with a cooling water pipe (not shown) for providing the secondary cooling water which is made by a steam condenser (not shown) by cooling the steam used by the turbine.

The steam generator 101 explained above is applied to the nuclear power equipment 120 as shown in FIG. 14. The nuclear power equipment 120 as shown in FIG. 14 is a pressurized water reactor (PWR). The nuclear power equipment 120 is configured such that a containment 121, a pressurizing device 122, a steam generator 101, and a pump 123 are coupled in order by a primary cooling water pipe 124, thus constituting a circulation route for the primary cooling water. A circulation route for the secondary cooling water is made between the steam generator 101 and the turbine (not shown).

The containment 121 includes a containment main body 121a and a containment lid 121b attached to the upper portion of the containment main body 121a, so that a fuel assembly (not shown) can be inserted and removed. The containment lid 121b is configured to be able to open and close with respect to the containment main body 121a. The containment main body 121a is in a cylindrical shape of which upper side is open and of which lower side is in a hemispherical shape and closed. At the upper portion of the containment main body 121a, an inlet side nozzle 121c and an outlet side nozzle 121d are provided to feed and discharge light water serving as the primary cooling water. The outlet side nozzle 121d is connected to the primary cooling water pipe 124 so as to be in communication with the inlet side nozzle 107Aa of the steam generator 101. The inlet side nozzle 121c is connected to the primary cooling water pipe 124 so as to be in communication with the outlet side nozzle 107Ba of the steam generator 101.

In this nuclear power equipment 120, the primary cooling water is heated by the containment 121 to be high temperature and high pressure, and the primary cooling water is pressurized by the pressurizing device 122, and while the pressure is maintained at a constant level, the primary cooling water is provided via the primary cooling water pipe 124 to the steam generator 101. In the steam generator 101, the heated primary cooling water is fed to the inlet side channel head 107A, and the primary cooling water passes through many heat transfer tubes 105 to circulate and reach the outlet side channel head 107B. On the other hand, the secondary cooling water cooled by the steam condenser flows through the water feed pipe 111, and passes the water feed passage 113 in the body portion 102 and ascends along the heat transfer tube bundle 105A. At this occasion, in the body portion 102, heat exchange is performed between high-pressure and high-temperature primary cooling water and the secondary cooling water. Then, the cooled primary cooling water is returned from the outlet side channel head 107B back to the pressurized water reactor. On the other hand, the secondary cooling water which has been subjected to heat exchange with the high-pressure and high-temperature primary cooling water ascends in the body portion 102, and is separated by the steam-water separation device 109 into steam and hot water. Then, moisture is removed from the separated steam by the moisture separation device 110, and the steam flows from the steam discharge port 112 to the turbine. The turbine is driven by the steam of the secondary cooling water. Then, the force of the turbine is transmitted to an electric power generator (not shown), which generates electric power. The steam provided to drive the turbine is condensed to become water, which is provided to the steam generator 101. On the other hand, the primary cooling water which has been subjected to the heat exchange by the steam generator 101 is recovered by the pump 123 via the primary cooling water pipe 124.

Figure 6:
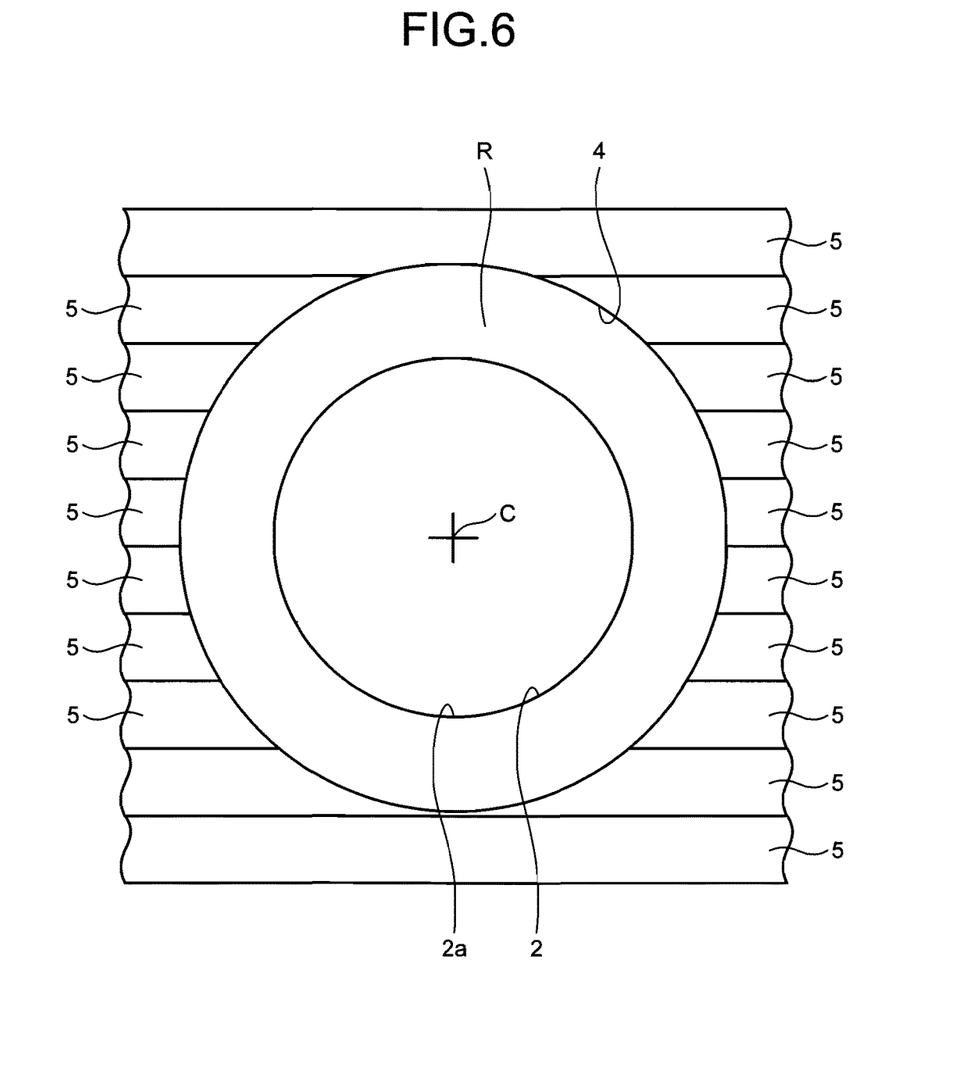
FIG. 6 is a process drawing of the welding method according to the embodiment of the present invention.
Figure 7:
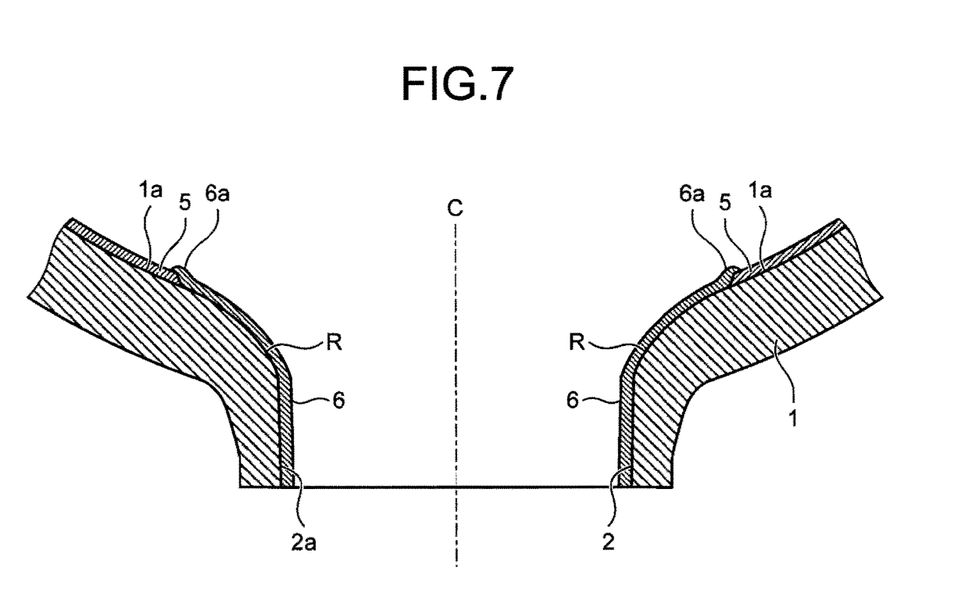
FIG. 7 is a process drawing of the welding method according to the embodiment of the present invention.
Figure 8:
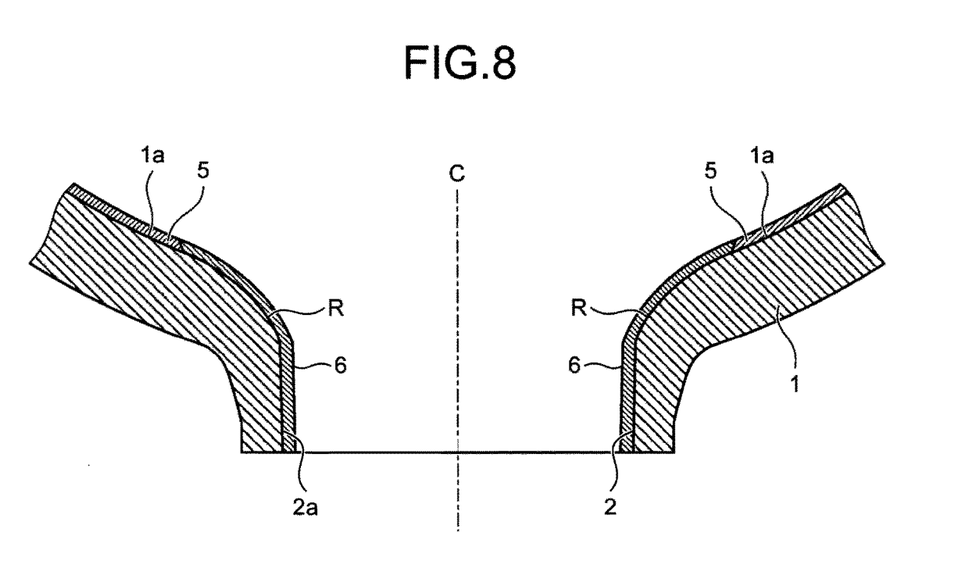
FIG. 8 is a process drawing of the welding method according to the embodiment of the present invention.

FIGS. 1 to 10 are process drawings of a welding method according to the present embodiment. As shown in FIG. 8, in the welding method according to the present embodiment, a first cladding or buttering 5 and a second cladding or buttering 6 are applied to an inner surface 1a of the base material 1 and an inner surface 2a of the opening portion 2 in a continuous manner for the base material 1 having the circular-shaped opening portion 2. The target to which the welding method according to the present embodiment is applied is the channel head 107 of the steam generator 101 explained above, where the channel head 107 is the base material 1, and the channel head 107 is formed with the circular-shaped opening portion 2 so as to make the inlet side nozzle 107Aa, the outlet side nozzle 107Ba, and the manholes 107Ab, 107Bb. The target to which the welding method according to the present embodiment is applied may also be such that the containment main body 121a of the containment 121 explained above is the base material 1, and the containment main body 121a is formed with the circular-shaped opening portion 2 so as to make the inlet side nozzle 121c and the outlet side nozzle 121d.

In this case, as shown in FIG. 8, in order to reduce stress concentration, the opening portion 2 has an arc-shaped cut surface R at the opening edge continuous to the inner surface 1a of the base material 1. The first cladding or buttering 5 and the second cladding or buttering 6 are applied to the inner surface 1a of the base material 1 and the inner surface 2a of the opening portion 2 in a continuous manner, which includes this cut surface R. The cut surface R is not limited to an arch shape and may also be formed in a tapered manner.

Figure 1:
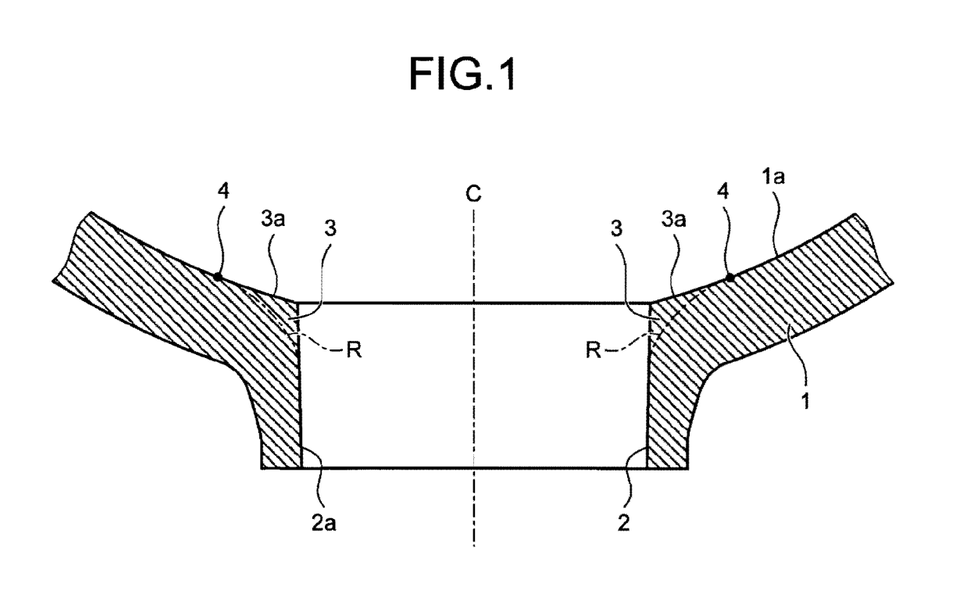
FIG. 1 is a process drawing of a welding method according to an embodiment of the present invention.
Figure 2:
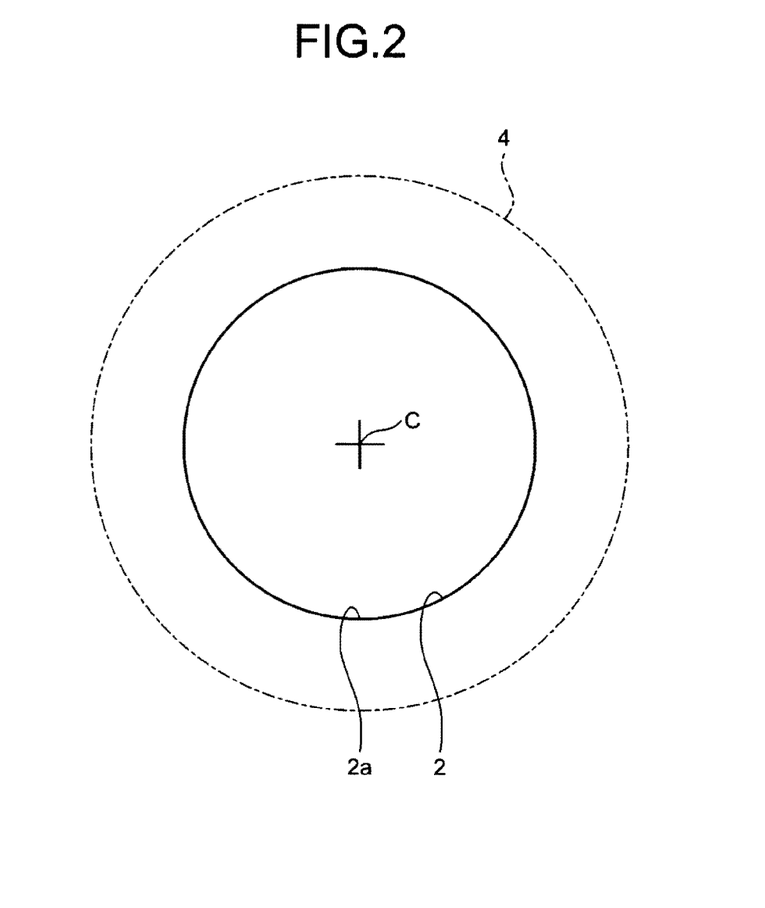
FIG. 2 is a process drawing of the welding method according to the embodiment of the present invention.

First, before the first cladding or buttering 5 and the second cladding or buttering 6 are applied, a protruding portion 3 is formed in advance as shown in FIGS. 1 and 2. The protruding portion 3 has a temporary welding surface 3a which is continuous from the inner surface 1a of the base material 1 toward the center C of the opening portion 2. The protruding portion 3 is formed so that the cut surface R is buried therein. Reference numeral 4 in FIGS. 1 and 2 denotes a border portion where the inner surface 1a of the base material 1 and the cut surface R are connected, and is along the locus of the circle based on the center C of the opening portion 2. The temporary welding surface 3a of the protruding portion 3 is formed from this border portion 4 to the center C of the opening portion 2.

Figure 3:
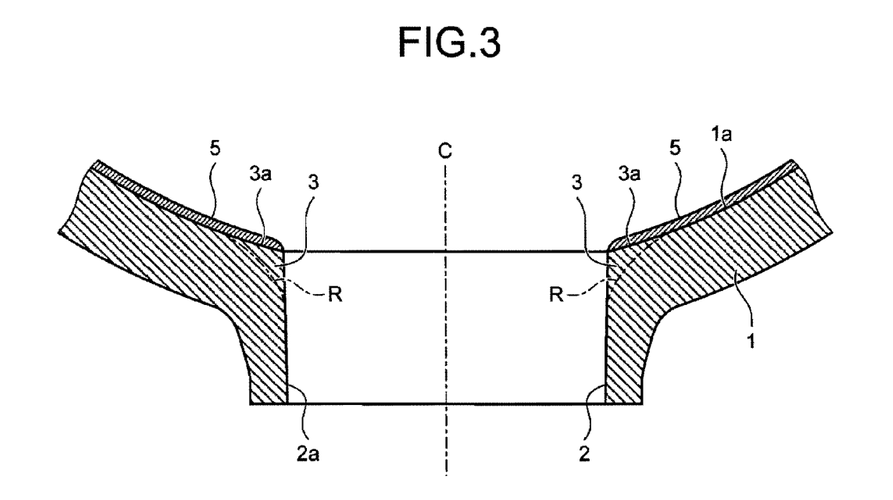
FIG. 3 is a process drawing of the welding method according to the embodiment of the present invention.
Figure 4:
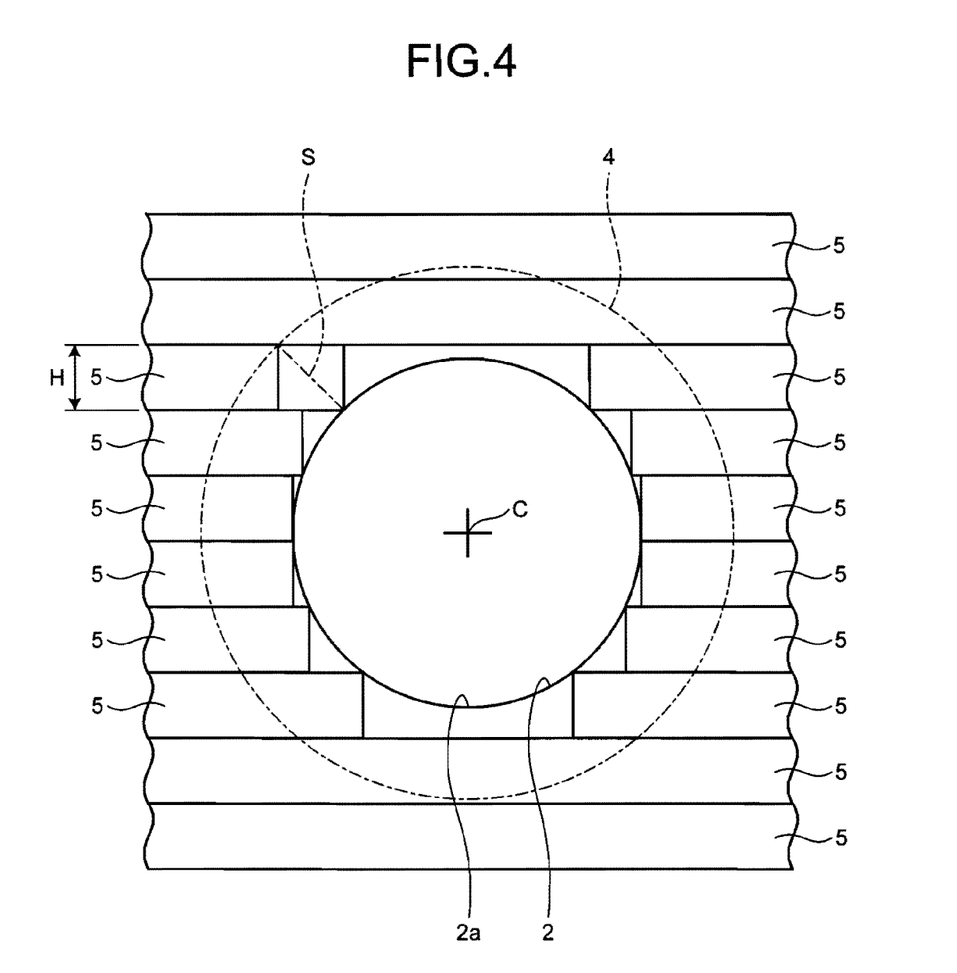
FIG. 4 is a process drawing of the welding method according to the embodiment of the present invention.

Subsequently, as shown in FIGS. 3 and 4, the first cladding or buttering 5 is applied. The first cladding or buttering 5 uses electroslag welding or submerged-arc welding. The electroslag welding or submerged-arc welding uses a flux shield for shielding with powdered flux. In the electroslag welding or submerged-arc welding, cladding or buttering is made in a belt-like manner having a predetermined width H using an automatic welding machine, and the belt-like forms are arranged in parallel, which can efficiently make cladding or buttering for a large area. This first cladding or buttering 5 is applied to the inner surface 1a of the base material 1 and the temporary welding surface 3a. Although the first cladding or buttering 5 is indicated as one layer in FIG. 3, the first cladding or buttering 5 may include multiple layers in accordance with a defined thickness of buttering.

This first cladding or buttering 5 is applied so that it extends from the inner surface 1a of the base material 1 explained above, over the border portion 4, and to the temporary welding surface 3a. However, in a case where the width H of the first cladding or buttering 5 extends out of the edge of the temporary welding surface 3a at the center C, the flux may drop from the temporary welding surface 3a, and therefore, it is difficult to apply the first cladding or buttering 5. Therefore, the minimum range S of the temporary welding surface 3a from the border portion 4 toward the center C of the opening portion 2, so that, in accordance with the width H of the first cladding or buttering 5, the first cladding or buttering 5 is applied to the temporary welding surface 3a so that the first cladding or buttering 5 extends beyond the border portion 4 from the inner surface 1a of the base material 1, and in such a manner that the first cladding or buttering 5 does not extend out of the edge of the temporary welding surface 3a at the center C.

This minimum range S may be such that a square of which side is the width H of the first cladding or buttering 5 fits within the temporary welding surface 3a arranged from the border portion 4 toward the center C of the opening portion 2. The minimum range S is obtained in a case where the square of which side is the width H of the first cladding or buttering 5 is located such that a virtual line passing the center C of the circular-shaped opening portion 2 is the diagonal line. More specifically, the minimum range S is $H^{1/2}$. As a result, the protruding portion 3 has the temporary welding surface 3a in a range of at least $H^{1/2}$ from the border portion between the cut surface R and the inner surface 1a of the base material 1 toward the center C of the opening portion 2 with respect to the width H of the first cladding or buttering 5. For example, in a case where the width H of the first cladding or buttering 5 is 75 mm, the minimum range S is about 106 mm. However, in view of the ease of the processing of the first cladding or buttering 5, the range of the temporary welding surface 3a from the border portion 4 toward the center C of the opening portion 2 is preferably about 130 mm. In the present embodiment, the edge of the temporary welding surface 3a at the center is indicated as matching the inner surface 2a of the opening portion 2, but since the minimum range S is determined in accordance with the position of the border portion 4 and the width H of the first cladding or buttering 5, the edge of the temporary welding surface 3a at the center C may be at a position projecting toward the center C with respect to the inner surface 2a of the opening portion 2, or may be at a position withdrawn toward the border portion 4 with respect to the inner surface 2a of the opening portion 2.

Figure 5:
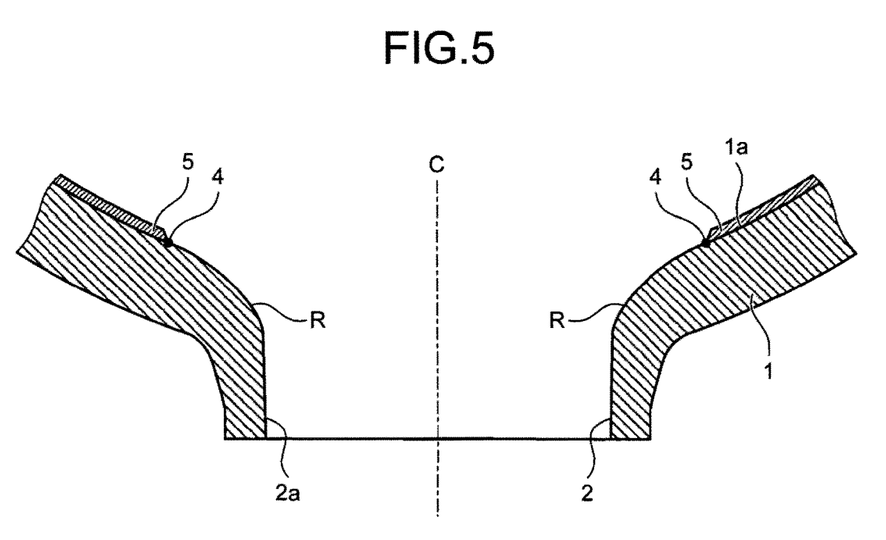
FIG. 5 is a process drawing of the welding method according to the embodiment of the present invention.

Subsequently, as shown in FIGS. 5 and 6, the protruding portion 3 as well as a portion of the first cladding or buttering 5 are cut so as to form the cut surface R in such a manner that the cut surface R is along the contour shape of the inner surface 2a of the opening portion 2. The cut surface R is made by performing cutting process up to the border portion 4, and at the same time, the first cladding or buttering 5 is cut along the border portion 4. As a result, the first cladding or buttering 5 is cut along the circle based on the center C of the opening portion 2.

Subsequently, as shown in FIGS. 7 and 8, the second cladding or buttering 6 is made. The second cladding or buttering 6 is applied to the inner surface 2a of the opening portion 2 and the cut surface R along the contour shape of the inner surface 2a of the opening portion 2 so that the second cladding or buttering 6 is continuous to the first cladding or buttering 5. The second cladding or buttering 6 uses TIG welding. In this case, the welding can be made along the circle based on the center C of the opening portion 2, and therefore, automatic welding can be used. It should be noted that the second cladding or buttering 6 may use MIG welding instead of the TIG welding. As shown in FIG. 7, the second cladding or buttering 6 is applied so that an overlapping portion 6a is provided, which partially overlaps the first cladding or buttering 5, and thereafter, as shown in FIG. 8, by cutting the overlapping portion 6a, the second cladding or buttering 6 is made to have a uniform thickness that is continuous to the first cladding or buttering 5. Like the first cladding or buttering 5, although the second cladding or buttering 6 is indicated as one layer in FIGS. 7 and 8, the second cladding or buttering 6 may include multiple layers in accordance with a defined thickness of buttering.

As described above, the welding method according to the present embodiment is a welding method for making cladding or buttering on the inner surface 1a of the base material 1, the inner surface 2a of the opening portion 2 formed in the base material 1, and the cut surface R formed in such a manner that the cut surface R is continuous from the inner surface 1a of the base material 1 to the inner surface 2a of the opening portion 2, wherein the welding method includes a step of forming a protruding portion 3 on the base material 1 in advance, the protruding portion 3 including the temporary welding surface 3a extending toward the center C of the opening portion 2 in such a manner that the temporary welding surface 3a is uniformly continuous to the inner surface 1a of the base material 1 and including the cut surface R buried therein, subsequently a step of making the first cladding or buttering 5 on the inner surface 1a of the base material 1 and the temporary welding surface 3a so that belt-like forms each having a predetermined width are arranged in parallel thereon, subsequently a step of forming the cut surface R by cutting the protruding portion 3 as well as a portion of the first cladding or buttering 5 so that the cut surface R is along the contour shape of the inner surface 2a of the opening portion 2, subsequently a step of making the second cladding or buttering 6 on the inner surface 2a of the opening portion 2 and the cut surface R so that the second cladding or buttering 6 is continuous to the first cladding or buttering 5 along the contour shape of the inner surface 2a of the opening portion 2.

According to this welding method, the protruding portion 3 including the temporary welding surface 3a extending toward the center C of the opening portion 2 in such a manner that the temporary welding surface 3a is uniformly continuous to the inner surface 1a of the base material 1 and including the cut surface R buried therein is formed in the base material 1 in advance, so that the first cladding or buttering 5 thereafter applied to the inner surface 1a and the temporary welding surface 3a of the base material 1 is provided to be in contact with the cut surface R. Therefore, when the cut surface R is thereafter formed by cutting the protruding portion 3 as well as a portion of the first cladding or buttering 5 so that the cut surface R is along the contour shape of the inner surface 2a of the opening portion 2, the edge of the first cladding or buttering 5 at the opening portion 2 is cut along the contour shape of the inner surface 2a of the opening portion 2. As a result, when the second cladding or buttering 6 is thereafter made on the inner surface 2a of the opening portion 2 and the cut surface R along the contour shape of the inner surface 2a of the opening portion 2 so that the second cladding or buttering 6 is continuous to the first cladding or buttering 5, the first cladding or buttering 5 is continuous to the second cladding or buttering 6, and therefore, it is not necessary to manually make cladding or buttering at the border between the first cladding or buttering 5 and the second cladding or buttering 6, and the cladding or buttering can be efficiently made for the base material 1 having the opening portion 2 on the inner surfaces 1a, 2a of the opening portion 2 and the base material 1.

In the welding method according to the present embodiment, where the width of the first cladding or buttering 5 is denoted as H, the protruding portion 3 has the temporary welding surface 3a in range of at least $H^{1/2}$ from the border portion 4 between the cut surface R and the inner surface 1a of the base material 1 to the center C of the opening portion 2.

According to this welding method, the temporary welding surface 3a is provided in a range of at least $H^{1/2}$ from the border portion 4 between the cut surface R and the inner surface 1a of the base material 1 to the center C of the opening portion 2, and therefore, the first cladding or buttering 5 can be applied so as to be in contact with the border portion 4. As a result, when the cut surface R is formed, the edge of the first cladding or buttering 5 at the opening portion 2 is cut along the contour shape of the inner surface 2a of the opening portion 2, so that the second cladding or buttering 6, which is thereafter made, can be made so as to be reliably continuous to the first cladding or buttering 5. In addition, when the protruding portion 3 is formed to have the temporary welding surface 3a in the range of $H^{1/2}$, not only the above effects are obtained but also the cut surface R can be processed efficiently by limiting the amount of cutting of the protruding portion 3 to the minimum.

Figure 9:
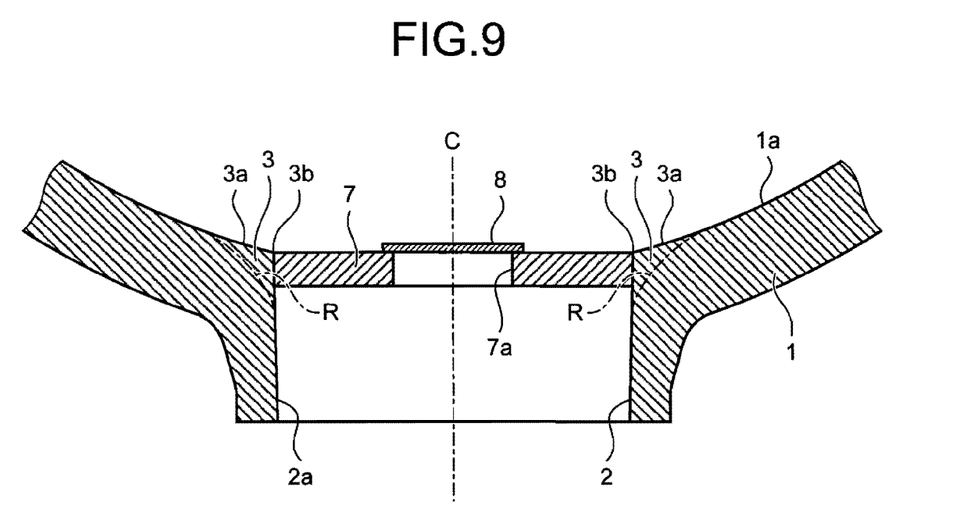
FIG. 9 is a process drawing of the welding method according to the embodiment of the present invention.

By the way, in the welding method according to the present embodiment, as shown in FIG. 9, the protruding portion 3 is formed to have a corner portion 3b which connects from the temporary welding surface 3a to the inner surface 2a of the opening portion 2. In the step of making the first cladding or buttering 5, a tab 7 is preferably provided to cover a least the periphery of the opening portion 2 so as to be in contact with the corner portion 3b.

According to this welding method, when the electroslag welding or the submerged-arc welding is employed for the first cladding or buttering 5, the tab 7 prevents the flux from dropping from the opening portion 2, and therefore, the first cladding or buttering 5 can be applied to the entire temporary welding surface 3a of the protruding portion 3. Moreover, the tab 7 is provided to be in contact with the corner portion 3b which connects from the temporary welding surface 3a of the protruding portion 3 to the inner surface 2a of the opening portion 2, and therefore, this configuration enables stable arrangement. If the first cladding or buttering 5 is made after the cut surface R is formed, the arrangement of the tab 7 becomes unstable, and it is difficult to sufficiently prevent the flux from dropping from the opening portion 2. Although not shown in the drawings, the tab 7 may be provided to completely cover the opening portion 2.

Figure 10:
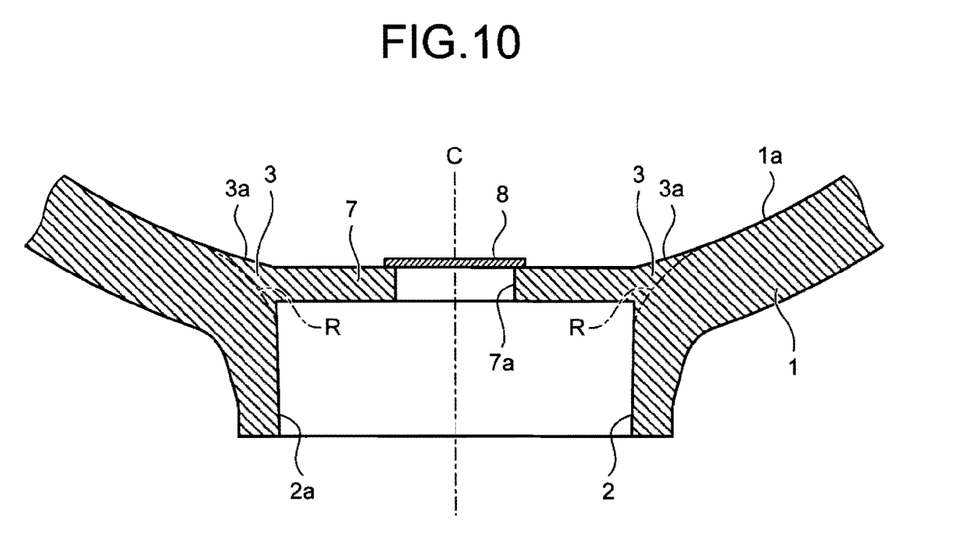
FIG. 10 is a process drawing of the welding method according to the embodiment of the present invention.

In the welding method according to the present embodiment, as shown in FIG. 10, the protruding portion 3 may extend from the temporary welding surface 3a toward the center C of the opening portion 2, and may be integrally formed with the tab 7 covering at least the periphery of the opening portion 2.

According to this welding method, when the first cladding or buttering 5 uses electroslag welding or submerged-arc welding, the tab 7 prevents the flux from dropping from the opening portion 2, and therefore, the first cladding or buttering 5 can be applied to the entire temporary welding surface 3a of the protruding portion 3. Although not shown in the drawings, the tab 7 may be provided to completely cover the opening portion 2.

In the welding method according to the present embodiment, as shown in FIGS. 9 and 10, an opening hole 7a may be provided in the center of the tab 7, and in the step of making the first cladding or buttering 5, a lid 8 closing the opening hole 7a is preferably provided.

According to this welding method, when the first cladding or buttering 5 uses electroslag welding or submerged-arc welding, the tab 7 and the lid 8 prevent the flux from dropping from the opening portion 2, and therefore, the first cladding or buttering 5 can be made on the entire temporary welding surface 3a of the protruding portion 3.

The steam generator channel head according to the present embodiment is made as follows. The protruding portion 3 is formed before cladding or buttering of a predetermined thickness is made continuously on the inner surface 1a of the inlet side channel head 107A and the outlet side channel head 107B, the inner surface 2a of the opening portion 2 constituting the inlet side nozzle 107Aa, the outlet side nozzle 107Ba, and the manholes 107Ab, 107Bb, and the cut surface R formed continuously from the inner surface 1a of the channel heads 107A, 107B to the inner surface 2a of the opening portion 2. The protruding portion 3 includes the temporary welding surface 3a extending toward the center C of the opening portion 2 in such a manner that the temporary welding surface 3a is uniformly continuous to the inner surface 1a of the channel heads 107A, 107B and including the cut surface R buried therein and formed continuous from the inner surface 1a of the channel heads 107A, 107B to the inner surface 2a of the opening portion 2.

According to this steam generator channel head, the protruding portion 3 including the temporary welding surface 3a extending toward the center C of the opening portion 2 in such a manner that the temporary welding surface 3a is uniformly continuous to the inner surface 1a of the channel heads 107A, 107B and including the cut surface R buried therein is formed in advance in the channel heads 107A, 107B, so that the first cladding or buttering 5 thereafter applied to the inner surface 1a and the temporary welding surface 3a of the channel heads 107A, 107B is provided to be in contact with the cut surface R. Therefore, when the cut surface R is thereafter formed by cutting the protruding portion 3 as well as a portion of the first cladding or buttering 5 so that the cut surface R is along the contour shape of the inner surface 2a of the opening portion 2, the edge of the first cladding or buttering 5 at the opening portion 2 is cut along the contour shape of the inner surface 2a of the opening portion 2. As a result, when the second cladding or buttering 6 is thereafter made on the inner surface 2a of the opening portion 2 and the cut surface R along the contour shape of the inner surface 2a of the opening portion 2 so that the second cladding or buttering 6 is continuous to the first cladding or buttering 5, the first cladding or buttering 5 is continuous to the second cladding or buttering 6, and therefore, it is not necessary to manually make cladding or buttering at the border between the first cladding or buttering 5 and the second cladding or buttering 6, and the cladding or buttering can be efficiently made for the channel heads 107A, 107B having the opening portion 2 on the inner surfaces 1a, 2a of the opening portion 2 and the channel heads 107A, 107B.

REFERENCE SIGNS LIST

1 BASE MATERIAL
1a INNER SURFACE
2 OPENING PORTION
2a INNER SURFACE
3 PROTRUDING PORTION
3a TEMPORARY WELDING SURFACE
3b CORNER PORTION
4 BORDER PORTION
5 FIRST CLADDING OR BUTTERING
6 SECOND CLADDING OR BUTTERING
7 TAB
7a OPENING HOLE
8 LID
101 STEAM GENERATOR
105 HEAT TRANSFER TUBE
105A HEAT TRANSFER TUBE BUNDLE
107 CHANNEL HEAD
107A INLET SIDE CHANNEL HEAD
107Aa INLET SIDE NOZZLE
107Ab MANHOLE
107B OUTLET SIDE CHANNEL HEAD
107Ba OUTLET SIDE NOZZLE
107Bb MANHOLE
C CENTER OF OPENING PORTION
H WIDTH
R CUT SURFACE
S MINIMUM RANGE

The invention claimed is:

1. A welding method for manufacturing a steam generator including a base material, a circular-shaped opening portion which is formed in the base material and has a radial center, and a cut surface having an arc-shape at an opening edge of the circular-shaped opening portion continuous to an inner surface of the base material, the welding method comprising:

forming a protruding portion directly on and directly contacting the base material of the steam generator, the protruding portion including a welding surface extending toward the radial center of the circular-shaped opening portion in such a manner that the welding surface is continuous to the inner surface of the base material;

subsequent to the forming the protruding portion, making a first cladding or buttering in which belt-like welding having a width is formed in parallel with respect to the inner surface of the base material and the welding surface;

subsequent to the making the first cladding or buttering, forming the cut surface by cutting the protruding portion as well as a portion of the first cladding or buttering along a contour shape of an inner surface of the circular-shaped opening portion;

subsequent to the forming the cut surface, making a second cladding or buttering with respect to an inner surface of a wall portion of the base material surrounding the circular-shaped opening portion and the cut surface along the contour shape of the inner surface of the circular-shaped opening portion such that the second cladding or buttering is formed continuously from the first cladding or buttering.

2. The welding method according to claim 1, wherein where a width of the first cladding or buttering is denoted as H, the protruding portion has the temporary welding surface in range of at least $H^{1/2}$ from a border portion between the cut surface and the surface of the base material to the center of the circular-shaped opening portion.

3. The welding method according to claim 1, wherein the protruding portion is formed to have a corner portion which connects from the welding surface to the inner surface of the circular-shaped opening portion, and in the step of making the first cladding or buttering, a tab is provided to cover at least a periphery of the circular-shaped opening portion so that the tab is in direct contact with the corner portion.

4. The welding method according to claim 1, wherein the protruding portion extends from the welding surface to the circular-shaped opening portion, and is integrally formed with a tab covering at least the periphery of the circular-shaped opening portion.

5. The welding method according to claim 3, wherein an opening hole is provided in a radial center of the tab, and in the step of making the first cladding or buttering, a lid closing the opening hole is provided.

6. The welding method according to claim 2, wherein the protruding portion is formed to have a corner portion which connects from the welding surface to the inner surface of the circular-shaped opening portion, and in the step of making the first cladding or buttering, a tab is provided to cover at least a periphery of the circular-shaped opening portion so that the tab is in direct contact with the corner portion.

7. The welding method according to claim 2, wherein the protruding portion extends from the welding surface to the circular-shaped opening portion, and is integrally formed with the tab covering at least the periphery of the circular-shaped opening portion.

8. The welding method according to claim 4, wherein an opening hole is provided in a radial center of the tab, and in the step of making the first cladding or buttering, a lid closing the opening hole is provided.

* * * * *